United States Patent Office 3,046,092
Patented July 24, 1962

---

3,046,092
TRIPOLYPHOSPHATE PROCESS IMPROVEMENT
Joseph L. Montague, Bayonne, N.J., assignor to Monsanto Chemical Company, St. Louis, Mo., a corporation of Delaware
No Drawing. Filed Mar. 11, 1960, Ser. No. 14,207
7 Claims. (Cl. 23—106)

This invention relates to the production of sodium tripolyphosphate hexahydrate. More particularly, it relates to an improved method for the hydration of anhydrous sodium tripolyphosphate.

Commercial sodium tripolyphosphate is usually sold in the anhydrous state. There are certain disadvantages in the sale of this material as an anhydrous powder. For example, the anhydrous powder is hygroscopic and, therefore, must be packaged in moisture-proof containers. It often adheres to the containers, becomes lumpy or caked, and loses its free-flowing property if it is exposed to a humid atmosphere for even a short while. When the anhydrous sodium tripolyphosphate is stirred into water, it generally tends to form cakes and lumps, and is, therefore, difficult to dissolve. Anhydrous sodium tripolyphosphate, in a granular form, rather than the powdered form, is not as difficult to handle under similar circumstances. However, it, too, presents some of these difficulties.

Sodium tripolyphosphate in its hydrated form $$(Na_5P_3O_{10}.6H_2O)$$

is much more capable of withstanding different conditions of humidity, storage, and use. Either powdered or granular hydrated material maintains its free-flowing characteristics in either dry or humid atmospheres. The hydrated tripolyphosphate also dissolves in water without caking or lumping.

As it is usually manufactured, sodium tripolyphosphate is in the anhydrous state. In order to be converted to the hydrated state, water must be added. In the past, this has been done in several ways. For example, sodium tripolyphosphate hexahydrate was precipitated from a water solution by the use of sodium chloride [R. N. Bell, Inorganic Synthesis, vol. 3, pp. 101–3, McGraw-Hill Co. (1950)] or by the use of water-miscible organic solvents [O. T. Quimby, J. Phys. Chem., vol. 58, p. 603 (1954)] and by vacuum evaporation of water from solutions of sodium tripolyphosphate (Swedish Patent 100,871). These three procedures have the disadvantage of requiring the disposal or reworking of mother liquor.

A fourth procedure for preparing sodium tripolyphosphate hexahydrate was recommended in British Patent 609,785. This patent recommended that the stoichiometric amount of water be sprayed onto a bed containing the anhydrous powder. The product from this procedure is usually very lumpy, and must be ground before use. In addition, some of the sodium tripolyphosphate usually degrades (hydrolyzes) to pyrophosphates and hydrogen-containing orthophosphates. When water is sprayed onto so-called "granular" anhydrous sodium tripolyphosphate, both lumping and physical breakdown of the individual particles occur. As a result, the sizes of particles in the hexahydrate produced in this manner are not the same as the sizes in the starting "granular" sodium tripolyphosphate. A solution to this problem has now been found.

The present invention is predicated upon the discovery that sodium tripolyphosphate hexahydrate with substantially the same particle size distribution as that of the anhydrous sodium tripolyphopshate starting material can be produced by hydrating the sodium tripolyphosphate with ice. Another surprising feature is that by practicing the instant invention, an undegraded sodium tripolyphosphate hexahydrate can be produced.

The ice which is used to hydrate the sodium tripolyphosphate is utilized in any of its several crystalline forms. Its particle size or shape is not critical. For example, the sodium tripolyphopshate can be hydrated by large, fist-sized lumps of ice, as well as very small chips or flakes of ice. But it is usually hydrated with chips or flakes of ice which are easily distributed through the tripolyphosphate, the small size of which reduces the time for complete hydration.

In order to assure uniform contacting of the ice and the tripolyphosphate, mechanical agitation is usually applied during the hydration. Suitable agitation is applied, for example, by means of a ribbon mixer. Better distribution of ice and tripolyphosphate is achieved by incremental addition of the ice to the tripolyphosphate.

The quantity of ice used for the hydration is dependent upon the degree of hydration desired for the sodium tripolyphosphate.

Generally, when one desires to hydrate all of the sodium tripolyphosphate present, not more than about 105%, by weight, of ice, based on the calculated stoichiometric amount required, is used. If one desires, however, to hydrate only part of the anhydrous sodium tripolyphosphate present, he uses only the calculated stoichiometric amount of ice which will satisfy his requirements. For example, if one desires to hydrate only 50% of the anhydrous sodium tripolyphopshate present, he uses only about one-half the stoichiometric amount of ice (based by weight upon the water content of the ice) which would be required to hydrate all of the anhydrous sodium tripolyphosphate with which he had started.

The instant invention can be practiced at any reaction (hydration) temperature between about 3° C. and about 95° C. However, the temperature of the hydrating mass is often maintained below about 65° C. and, in some cases, even below about 60° C.

EXAMPLE

To 500 pounds of granular anhydrous sodium tripolyphosphate in a ribbon mixer was added 150 pounds of flaked ice over a period of 45 minutes. The tripolyphosphate was agitated by a conventional double ribbon. The bed temperature during hydration did not rise above 65° C. Complete hydration occurred in less than one and one-half hours.

The hexahydrate product from the above example was identical, in physical appearance, to its starting anhydrous sodium tripolyphosphate. It was non-lumpy and granular. The surprising result that the screen size fractions from the product in the example were not changed during the practice of the instant invention is illustrated in Table I.

*Table I*

U.S. STANDARD MESH SIZE FRACTIONS OF GRANULAR SODIUM TRIPOLYPHOSPHATE

| | Before Hydration,[1] percent | After Hydration,[1] percent |
|---|---|---|
| + 20 mesh | 0 | 0 |
| + 100 mesh | 80.1 | 79.8 |
| − 100 mesh | 19.9 | 20.2 |

[1] Percent by weight.

Obviously, modifications and variations of the invention as hereinbefore set forth may be made without departing from the spirit and scope thereof.

What is claimed is:

1. A process which comprises contacting anhydrous sodium tripolyphosphate with a quantity of water in the form of ice which is less than about 105% of the stoichiometric amount required to hydrate the said anhydrous sodium tripolyphosphate to the hexahydrate, and retaining said water in contact with said anhydrous sodium tripolyphosphate until at least a portion of said water has reacted with said anhydrous sodium tripolyphosphate to produce sodium tripolyphosphate hexahydrate.

2. A process which comprises contacting anhydrous sodium tripolyphosphate at a temperature between about 3° C. and about 95° C. with a quantity of water in the form of ice which is less than about 105% of the stoichiometric amount required to hydrate the said anhydrous sodium tripolyphosphate, retaining said water in contact with said anhydrous sodium tripolyphosphate with agitation until a substantial portion of said anhydrous sodium tripolyphosphate has been converted to sodium tripolyphosphate hexahydrate, whereby there is produced a solid, particulated product containing said sodium tripolyphosphate hexahydrate.

3. A process which comprises contacting anhydrous sodium tripolyphosphate with a quantity of water in the form of ice which is less than about 105% of the stoichiometric amount required to hydrate the said anhydrous sodium tripolyphosphate, retaining said water in contact with said anhydrous sodium tripolyphosphate with agitation and at a temperature below about 65° C. until at least a significant portion of said anhydrous sodium tripolyphosphate has been converted to sodium tripolyphosphate hexahydrate, whereby there is produced a solid, particulated product containing said sodium tripolyphosphate hexahydrate.

4. The process of claim 3, wherein said temperature is below about 60° C.

5. A process which comprises contacting anhydrous sodium tripolyphosphate with a quantity of water in the form of ice which is about the stoichiometric amount required to hydrate said anhydrous sodium tripolyphosphate to the hexahydrate and retaining said water in contact with said anhydrous sodium tripolyphosphate until substantially all of said water has reacted with said anhydrous sodium tripolyphosphate to produce sodium tripolyphosphate hexahydrate.

6. A process which comprises contacting anhydrous sodium tripolyphosphate at a temperature between about 3° C. and about 95° C. with a quantity of water in the form of ice which is about the stoichiometric amount required to hydrate said anhydrous sodium tripolyphosphate to the hexahydrate and retaining said water in contact with said anhydrous sodium tripolyphosphate with agitation until substantially all of said water has reacted with said anhydrous sodium tripolyphosphate to produce sodium tripolyphosphate hexahydrate.

7. A process for the production of substantially pure, undegraded sodium tripolyphosphate hexahydrate, which process comprises contacting anhydrous sodium tripolyphosphate with a quantity of ice which is about the stoichiometric amount required to hydrate said anhydrous sodium tripolyphosphate and retaining said water in contact with said anhydrous sodium tripolyphosphate with agitation and at a temperature below about 65° C. until substantially all of said water has reacted with said anhydrous sodium tripolyphosphate whereby said sodium tripolyphosphate hexahydrate is produced in a solid, particulated form.

References Cited in the file of this patent
UNITED STATES PATENTS
2,174,614     Bornemann     Oct. 3, 1939

OTHER REFERENCES

Phosphorus and its Compounds, Van Wazer, vol. 1, Chemistry, Interscience, 1958, pages 648–656.